Dec. 3, 1940.    G. L. SHERWOOD    2,223,427
SLED
Filed March 13, 1939    2 Sheets-Sheet 1
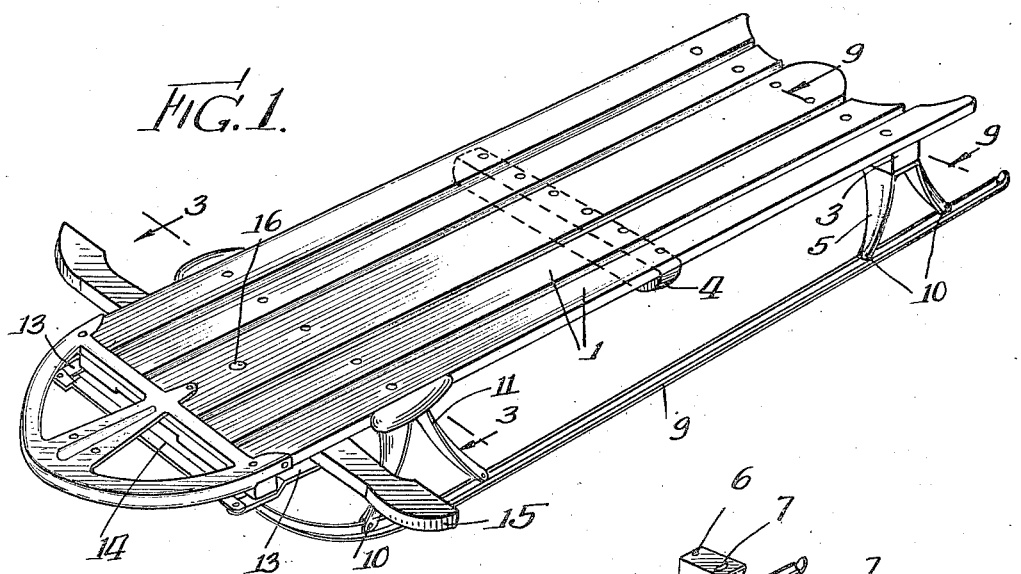
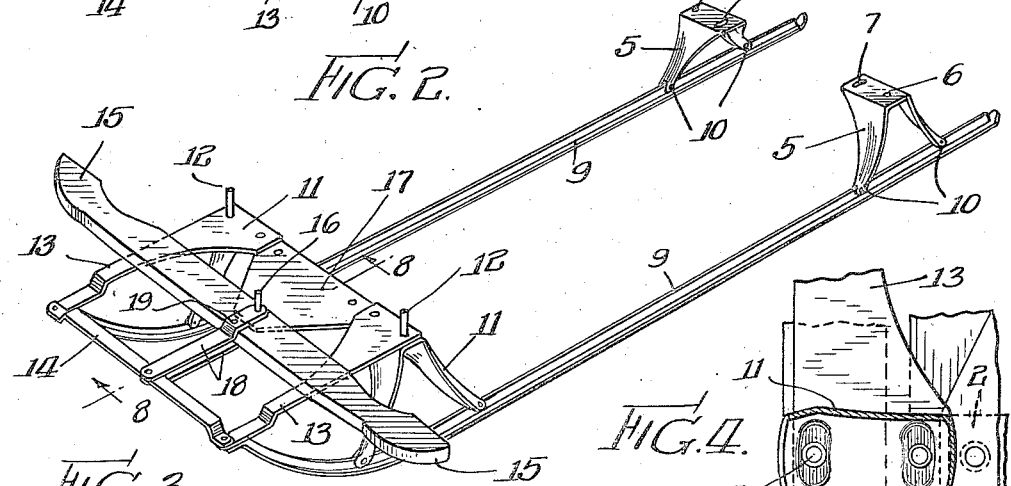
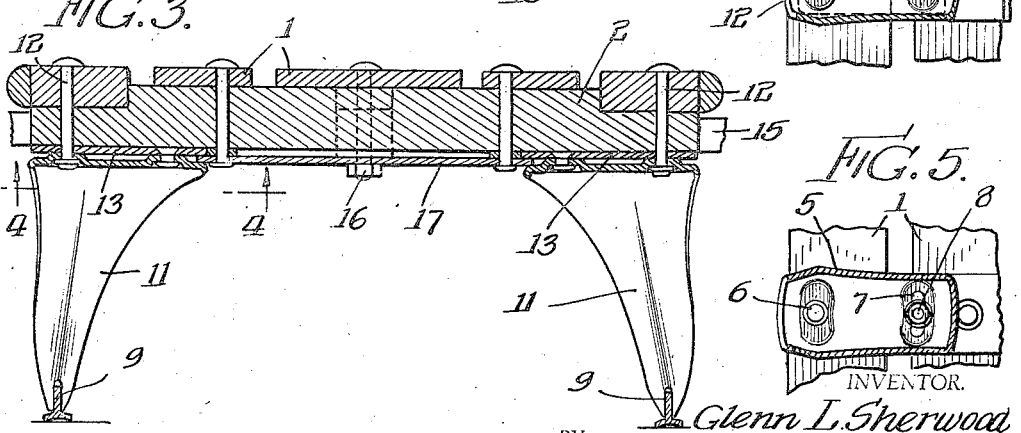
INVENTOR.
Glenn L. Sherwood
BY: Arthur F. Durand
ATTORNEY.

Dec. 3, 1940.  G. L. SHERWOOD  2,223,427
SLED
Filed March 13, 1939  2 Sheets-Sheet 2

INVENTOR.
Glenn L. Sherwood
BY Arthur A. Durand
ATTORNEY.

Patented Dec. 3, 1940

2,223,427

UNITED STATES PATENT OFFICE 2,223,427

SLED

Glenn L. Sherwood, Benton Harbor, Mich., assignor to Kaywood Corporation, Benton Harbor, Mich., a corporation of Michigan Application March 13, 1939, Serial No. 261,441

14 Claims. (Cl. 280—22)

This invention relates to sleds, and more particularly to those that have flexible runners, in combination with a steering gear for flexing the runners, thereby to steer the sled either to the right or the left.

Generally stated, the object of the invention is to provide a novel construction and arrangement whereby the front ends of the sled runners are flexed from side to side, thereby to laterally flex each runner practically throughout its length, so that the runners are simultaneously bowed laterally, first to one side and then to the other, thereby to steer the sled to the right or the left, the steering gear provided for that purpose being located forward and suitably connected with the front ends of the said runners.

It is also an object to provide certain novel details and specific features of construction and combinations tending to increase the general efficiency and desirability of a flexible runner sled of this particular character.

To the foregoing and other useful ends, the invention consists in matters hereinafter set forth and claimed and shown in the accompanying drawings, in which—

Fig. 1 is a perspective of a sled embodying the principles of the invention.

Fig. 2 is a similar view with the top or body of the sled omitted for convenience of illustration.

Fig. 3 is a transverse section on line 3—3 in Fig. 1 of the drawings.

Fig. 4 is a detail fragmentary sectional view on line 4—4 in Fig. 3 of the drawings.

Fig. 5 is a similar sectional view on line 5—5 in Fig. 9 of the drawings.

Figure 6:
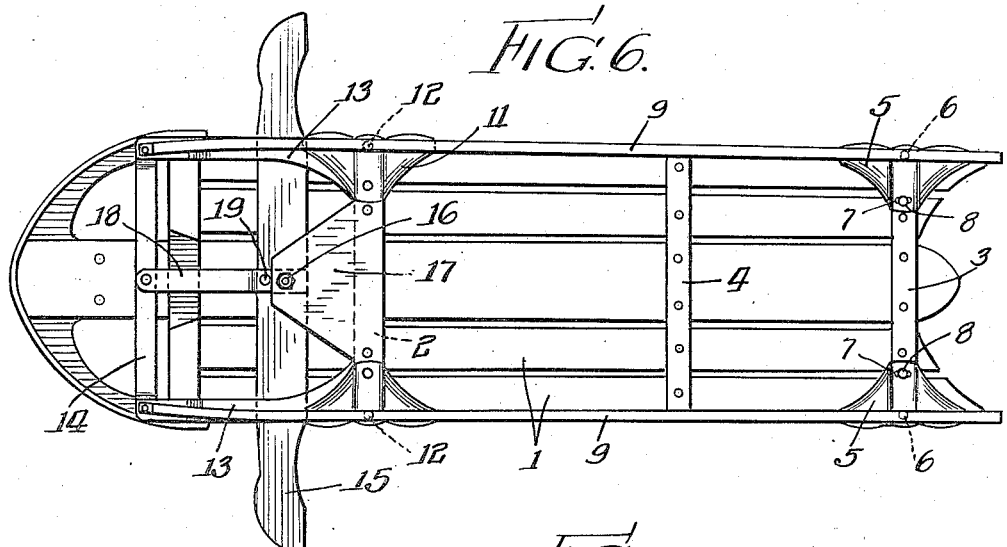
Fig. 6 is a plan view of the sled shown upside down.

As thus illustrated, the invention comprises a suitable top or body frame 1 for the sled, of any suitable form of construction. On the under side of said flat frame or body, there are front and rear cross pieces 2 and 3, and an intermediate transverse cross piece 4, as shown.

Rear brackets or legs 5 are pivoted on the cross piece 3 at 6, and are provided with segmental slots 7, through which bolts 8 are inserted through said cross piece, whereby these brackets may turn or skew about vertical axes. The parallel flexible runners 9 have their rear end portions rigidly secured at 10 to the lower end portions of the brackets 5, previously mentioned.

Figures 8, 9:
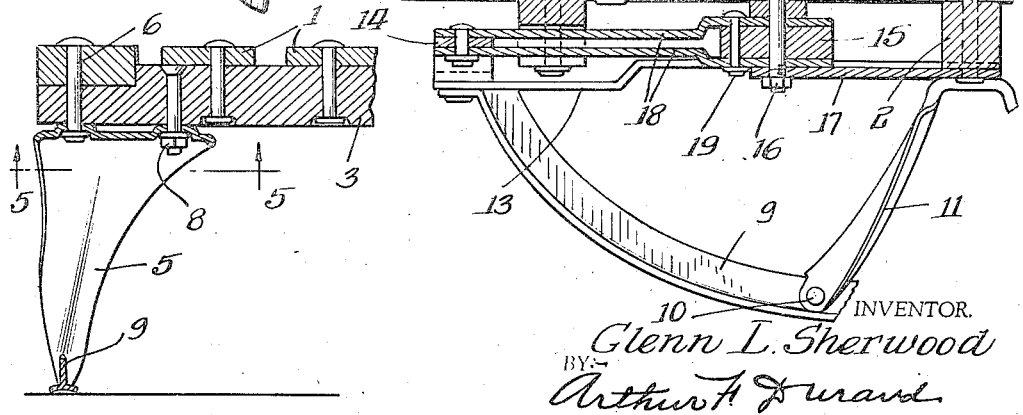
Fig. 8 is an enlarged longitudinal section on line 8—8 in Fig. 2 of the drawings.
Fig. 9 is an enlarged transverse fragmentary sectional view on line 9—9 in Fig. 1 of the drawings.

Similar brackets 11 are pivoted at 12 on the under side of the forward cross piece 2, previously mentioned. The two forwardly extending arms 13 are inserted between the tops of the brackets 11 and the under side of the cross piece 2, and are made rigid with said brackets. The front ends of the arms 13 are tied or connected together by a cross bar 14 having its ends pivoted on the front ends of said arms. A transverse steering bar 15 is pivoted by a king bolt 16 on the body and on the metal plate 17, which latter is rigidly secured to the under side of the transverse cross piece 2, previously mentioned, but the edges of this plate 17 preferably overlap the inner edges of the arms 13, to provide guides for the latter when they oscillate about the pivots 12 previously mentioned. The bolt 16 has a nut on its lower end bearing against the under side of the plate 17, as shown in the drawings. The cross bar 14 is connected by a pair of longitudinal bars 18 with the king bolt 16, in the manner shown more clearly in Fig. 8 of the drawings, and also by means of a supplemental bolt 19, as shown, whereby the straps or arms 18 are absolutely rigid with the steering bar 15 of the sled.

Figure 7:
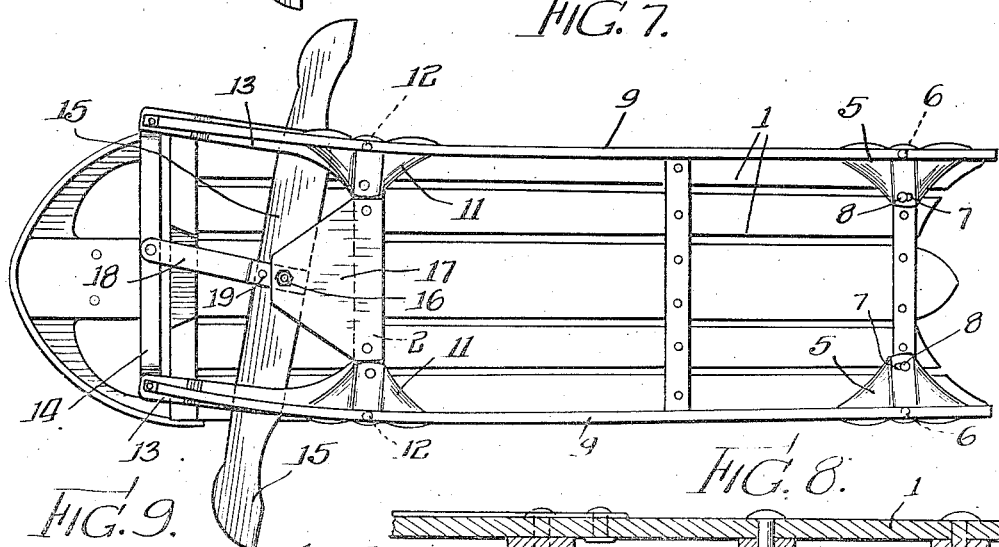
Fig. 7 is a similar view showing the runners flexed by the steering gear.

Thus, with the construction shown and described, the skewing of the steering bar 15, in the manner shown in Fig. 7, causes the runners 9 to flex or bow laterally for the purpose of steering the sled. Such skewing of the steering bar 15 shifts the cross bar 14 laterally of the sled, thus pushing the front ends of the runners to one side or the other, and in addition this action causes the arms 13 to oscillate about their pivots 12, so that even were the front ends of the runners not attached to the cross bar 15, there would still be a flexing of the runners by the oscillation of the brackets 11 about their vertical axes. During such flexing of the runners, it is obvious, as indicated in Fig. 7, that the rear brackets 5 are also oscillated about their vertical axes provided by the pivots 6 previously mentioned. Thus, an effective bowing or flexing of the runners is insured for steering purposes, each runner being substantially flexed throughout the length thereof, by a steering gear applied and connected to the front end portions of the runners for that purpose, leaving the rear ends of the runners free to take care of themselves, so to speak, when the runners at their front ends are flexed to one side or the other.

It will be seen that the pivot 16 for the steering bar 15 occupies a fixed position on the body of the sled, as it is on the plate 17, which latter is rigid with the sled body. Also, the pivots 6 and 12 provide vertical axes located at fixed points on the body of the sled, and these vertical axes are all in rear of the steering bar 15 by which the sled runners are flexed laterally.

What I claim as my invention is:

1. A sled having laterally flexible runners, a transverse steering bar pivoted at its middle to skew or oscillate about a fixed vertical axis, connections between the steering bar and the front end portions of the runners to flex or bow the latter to one side or the other, about vertical axes fixed on the body of the sled in rear of said bar, and means rigid with the runners at said axes and actuated positively by said bar to assist in said flexing of the runners, by power communicated to the latter through said means.

2. A structure as specified in claim 1, said means comprising front pivoted brackets forming front legs between the body of the sled and said runners, and means for pivoting said brackets on the body to oscillate about vertical axes.

3. A structure as specified in claim 1, said means comprising front pivoted brackets forming front legs between the body of the sled and said runners, and means for pivoting said brackets on the body to oscillate about vertical axes, the connections between the steering bar and the front portions of the runners comprising forwardly extending arms rigid at their rear ends with said brackets and connected at their forward ends with the front ends of the runners, and comprising also an arm rigid with said steering bar and pivotally connected with the front ends of said forwardly extending arms.

4. A structure as specified in claim 1, comprising front brackets forming said means, and rear brackets, each bracket having its top pivoted on the sled body to oscillate about a vertical axis, and with each bracket rigidly secured to the runner.

5. A structure as specified in claim 1, said steering bar and connections being adapted and arranged to act on the extreme front ends of the runners, and also on portions of the runners immediately in the rear of said extreme front ends.

6. A structure as specified in claim 1, said means comprising brackets forming legs between the runners and the under side of the sled body, each bracket being pivoted to oscillate about one of said vertical axes when the runners are bowed or flexed to one side or the other.

7. A structure as specified in claim 1, comprising front pivoted brackets forming front legs between the body of the sled and said runners, and means for pivoting said brackets on the body to oscillate about said vertical axes, the connections between the steering bar and the front portions of the runners comprising forwardly extending arms rigid at their rear ends with said brackets and connected at their forward ends with the front ends of the runners, and comprising also an arm rigid with said steering bar and pivotally connected with the front ends of said forwardly extending arms, together with a plate rigid with the sled body and forming guides for the rear portions of said forwardly extending arms, and a king bolt extending through said plate and body at the middle of said steering bar.

8. A sled having a pair of laterally flexible runners, a pair of brackets pivoted on the under side of the body of the sled to turn about fixed vertical axes, the lower ends of the brackets being secured to said runners, a pair of longitudinal arms rigid with the tops of said brackets, a transverse link pivoted on the ends of said arms, and steering gear pivoted at a fixed point on the sled body and connected to said link, to move the latter endwise, thereby to skew the brackets about their vertical axes and thus flex the runners laterally.

9. A structure as specified in claim 8, said arms extending forwardly, and said steering gear comprising a transverse steering bar provided with a rigid arm having pivotal connection with the middle portion of said link.

10. A structure as specified in claim 8, said steering gear comprising a transverse steering bar having pivotal connection with the middle portion of said link.

11. A sled having laterally flexible runners, a cross-bar rigid with the under side of the forward portion of the sled body, brackets pivoted at their upper ends on the bottom of said bar, secured at their lower ends to said runners, a plate rigid with said bar, extending forward from the under side of the latter, between the tops of said brackets, a forwardly extending member rigid at its rear end with the top of each bracket, a front bar having its ends pivoted on the front ends of said members, and on the front ends of said runners, a steering bar pivoted on the front portion of said plate, and an arm pivoted at its front end on the middle portion of said front bar and rigid at its rear end with said steering bar.

12. A structure as specified in claim 11, and means forming vertical pivots for the rear end portions of the runners, leaving the middle portions of the runners free to flex laterally.

13. A structure as specified in claim 11, the pivot for said steering bar comprising a bolt extending downward through the body of the sled and provided at its lower end with a nut bearing against the under side of said plate.

14. A structure as specified in claim 11, said steering bar overlying said members at the middle of the latter.

GLENN L. SHERWOOD.